July 27, 1948.　　C. D. SCHERMULY ET AL　　2,446,110
ROCKET
Filed July 25, 1944　　2 Sheets-Sheet 1

Inventors
Conrad David Schermuly
Alfred James Schermuly
Charles Schermuly
by their attorneys
Howson and Howson July 27, 1948.  C. D. SCHERMULY ET AL  2,446,110
ROCKET
Filed July 25, 1944    2 Sheets-Sheet 2

INVENTORS.
Conrad David Schermuly
Alfred James Schermuly
Charles Schermuly
By their attorneys
Howson and Howson Patented July 27, 1948

2,446,110

UNITED STATES PATENT OFFICE 2,446,110

ROCKET

Conrad David Schermuly, Alfred James Schermuly, and Charles Schermuly, Parkgate, Newdigate, England, assignors to The Schermuly Pistol Rocket Apparatus Limited, Parkgate, Newdigate, Surrey, England, a British company Application July 25, 1944, Serial No. 546,483
In Great Britain June 23, 1943

4 Claims. (Cl. 102—50)

This invention relates to rockets and has for its principal object to provide a rocket of small size which can be fired from a pistol or discharger constructed normally to take a rocket of a larger size.

In the specification of our co-pending United States Patent 2,409,904, issued October 22, 1946, we have described a rocket having tail fins which are secured to bands slidable on the rocket casing, a suitable stop being provided to limit the rearward movement of the said fins. The stop member comprises a plate which is a sliding fit in the discharger or pistol barrel, the said plate being secured to the choke end of the rocket. The rocket according to the aforesaid specification is adapted to be fired from a discharger or pistol having a bore slightly larger than the rocket so that the latter is a sliding fit in the former and the tail elements pass outside the discharger barrel.

It has been found that although rockets of the said kind may be satisfactorily fired from a discharger under their own power, it is desirable at times to use a cartridge in the discharger for ejecting the rocket but the use of a cartridge in the discharger results in such an increase in the speed of the rocket that the sudden stoppage by the stop member of the band carrying the tail elements sometimes results in the shearing off of the stop member or in damage to the tail, thereby affecting the performance of the rocket.

According to this invention a rocket comprises a casing, a stop member of greater diameter than said casing arranged at the rear end of said casing, and a plurality of holes in said stop member adjacent its periphery for the passage of gases from a cartridge used for firing the rocket.

The stop member may consist of a ring suitably secured to the rear end of the rocket, a disc over the rear end of the rocket or an extension or flange on the choke in the rear end of the rocket.

Figure 1:
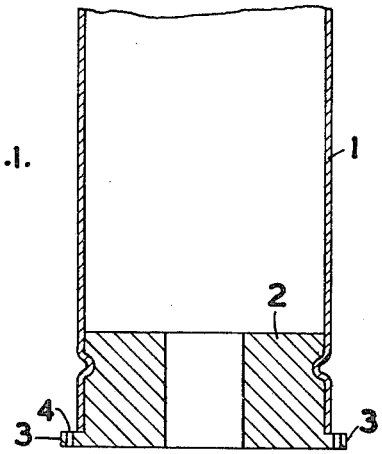
Figure 2:
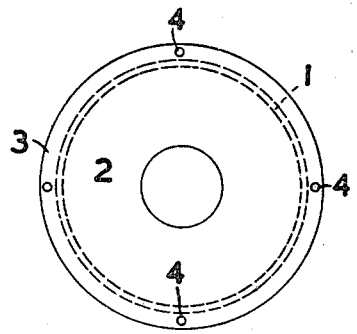
Figure 3:
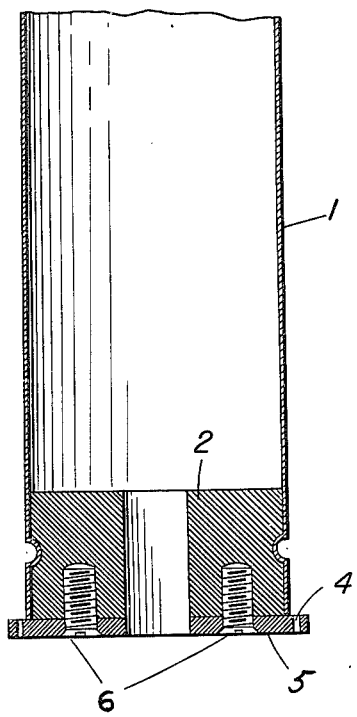
Figure 4:
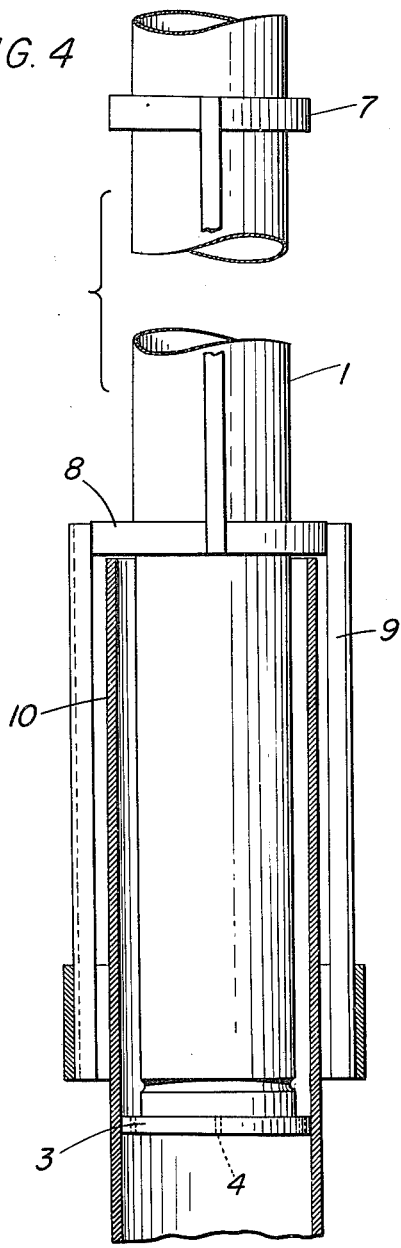

The invention will now be described with reference to the accompanying drawings in which Figure 1 is a section of the rear portion of a rocket; Figure 2 is an end view of Figure 1; Figure 3 is a vertical section of the rear portion of a modified form of our novel rocket; Figure 4 is a partial broken view in elevation of our novel construction applied to a rocket in a discharger, the discharger barrel being shown in section.

The rocket casing 1 is cannelured at its rear end into a choke 2. The choke 2 has a stop member constituted by a flange 3 of greater diameter than the casing 1 adapted to be a sliding fit in the discharger or pistol from which the rocket is to be fired. The flange 3 is provided with a plurality of holes 4 adjacent its periphery, the said holes 4 being arranged on a diameter greater than that of the casing 1.

As shown in Figure 3 the stop member may comprise a plate 5 attached as by screws 6, or other suitable means, to the rear end of the choke.

When the rocket is fired, some of the gases from the cartridge used for firing the rocket pass through the holes 4 into the space between the casing 1 and the discharger or pistol from which the rocket is fired.

When the invention is applied to a rocket having on the casing 1 sliding bands 7 and 8 carrying tail fins 9, which tail fins pass outside the discharger barrel 10, as shown in Figure 4, the gases passing through the holes 4 impinge on the said bands, but since these bands are some distance from the stop member 3 there is a slight delay between the contact of the gases on the rear of the rocket and on said bands. The gases passing through the holes 4 thus form a cushion which reduces the force of the blow of the tail against the stop member.

Various modifications within the scope of the appended claims may be made in the construction disclosed herein without departing from the spirit of this invention.

We claim:

1. A rocket comprising a casing, a tail unit slidable on said casing, a stop member of greater diameter than said casing arranged at the rear end of said casing to limit rearward movement of said tail unit, and a plurality of holes in said stop member adjacent its periphery for the passage of gas to cushion the blow of the tail unit against the stop member when the rocket is fired from a discharger.

2. A rocket as claimed in claim 1 in which the stop member is constituted by a disc over the rear end of the rocket.

3. A rocket as claimed in claim 1 in which the stop member is constituted by a flange on the choke in the rocket.

4. A rocket comprising a casing, a plurality of bands on said casing for carrying tail fins, a stop member on the rear end of said casing of greater diameter than said casing to limit rearward movement of said bands, and a plurality of holes in said stop member adjacent its periphery for the passage of gases to impinge on said bands and cushion the blow of said bands against said stop member.

CONRAD DAVID SCHERMULY.
  ALFRED JAMES SCHERMULY.
  CHARLES SCHERMULY.

REFERENCES CITED

The following references are of record in the file of this patent:

UNITED STATES PATENTS

| Number | Name | Date |
|---|---|---|
| 165,255 | Reilly | July 6, 1875 |
| 2,344,957 | Anzalone | Mar. 28, 1944 |